(12) United States Patent
Chlystek et al.

(10) Patent No.: US 11,542,970 B2
(45) Date of Patent: Jan. 3, 2023

(54) EDGE PROTECTOR

(71) Applicant: ILLINOIS TOOL WORKS INC., Glenview, IL (US)

(72) Inventors: Thomas Michael Chlystek, Darien, IL (US); Lucas Whaley Kroeger, Fenton, MI (US)

(73) Assignee: Illinois Tool Works Inc., Glenview, IL (US)

( * ) Notice: Subject to any disclaimer, the term of this patent is extended or adjusted under 35 U.S.C. 154(b) by 388 days.

(21) Appl. No.: 16/628,873

(22) PCT Filed: Jun. 13, 2018

(86) PCT No.: PCT/US2018/037184
§ 371 (c)(1),
(2) Date: Jan. 6, 2020

(87) PCT Pub. No.: WO2019/013915
PCT Pub. Date: Jan. 17, 2019

(65) Prior Publication Data
US 2020/0224686 A1    Jul. 16, 2020

Related U.S. Application Data

(60) Provisional application No. 62/530,990, filed on Jul. 11, 2017.

(51) Int. Cl.
*F16B 2/24* (2006.01)
*F16B 5/06* (2006.01)

(52) U.S. Cl.
CPC ............ *F16B 2/245* (2013.01); *F16B 5/0635* (2013.01)

(58) Field of Classification Search
CPC .... F16B 2/245; F16B 5/0635; B60R 13/0206; B65D 81/054; Y10T 428/24198; B60J 10/33
See application file for complete search history.

(56) References Cited

U.S. PATENT DOCUMENTS 2,974,383 A * 3/1961 Bright ............... B60J 10/26
24/294
3,282,657 A * 11/1966 Bright ............... B21D 53/74
428/595

(Continued)

FOREIGN PATENT DOCUMENTS

CN    1157602 A    8/1997
DE   102011107498 A1   1/2013
(Continued)

OTHER PUBLICATIONS

International Search Report and Written Opinion of the International Searching Authority from corresponding PCT Application No. PCT/US2018/037184, dated Sep. 18, 2018 (10 pages).

(Continued)

*Primary Examiner* — Robert Sandy
*Assistant Examiner* — Rowland Do
(74) *Attorney, Agent, or Firm* — Quarles & Brady LLP

(57) ABSTRACT

An edge protector (100) is configured to secure onto an edge of a component. The edge protector includes a main shrouding body (102) that includes a first wall (104) connected to a second wall (106) by a connecting wall (108). An open-ended passage (110) is defined between the first wall, the second wall, and the connecting wall. A first securing clamp (112) extends inwardly into the passage from the first wall. A second securing clamp (116) that opposes the first securing clamp extends inwardly into the passage from the second wall. The first securing clamp and the second securing clamp are configured to securely clamp onto a portion of the component. The edge protector may also include at least one cutout (122) formed in at least one of the first wall or the second wall.

20 Claims, 2 Drawing Sheets

(56) References Cited

U.S. PATENT DOCUMENTS

| | | | |
|---|---|---|---|
| 3,787,922 A * | 1/1974 | Foy | A47B 95/00 |
| | | | 16/404 |
| 4,105,814 A * | 8/1978 | Eggert | B60J 10/17 |
| | | | 428/122 |
| 5,015,802 A * | 5/1991 | Chi | H05K 9/0016 |
| | | | D13/133 |
| 5,598,609 A | 2/1997 | Asami | |
| 5,871,682 A * | 2/1999 | Kii | B60J 10/21 |
| | | | 264/285 |
| 6,279,207 B1 | 8/2001 | Vassiliou | |
| 7,051,408 B2 | 5/2006 | De Azevedo et al. | |
| 7,237,669 B2 | 7/2007 | Alldredge et al. | |
| 8,038,010 B1 | 10/2011 | Rometty et al. | |
| 8,397,448 B2 | 3/2013 | Brown et al. | |
| D696,106 S | 12/2013 | Tachibana | |
| 8,701,254 B2 | 4/2014 | Lin | |
| 8,758,872 B2 | 6/2014 | Mutoh et al. | |
| 8,959,807 B2 | 2/2015 | LaHood et al. | |
| 8,981,195 B2 | 3/2015 | Johnston | |
| 9,429,177 B2 | 8/2016 | Parrenin | |
| 9,434,323 B2 | 9/2016 | Huchet et al. | |
| 9,511,920 B2 | 12/2016 | Baker et al. | |
| D796,312 S | 9/2017 | Zappone | |
| 9,810,251 B2 | 11/2017 | Lewis et al. | |
| 9,834,071 B2 | 12/2017 | Alhof | |
| 10,124,948 B2 | 11/2018 | Baker et al. | |
| 10,202,995 B2 | 2/2019 | Stickelberger et al. | |
| 10,251,296 B2 | 4/2019 | Nakamura | |
| 10,298,169 B2 | 5/2019 | Martin | |
| 10,323,668 B2 | 6/2019 | Hiller | |
| 10,454,190 B1 * | 10/2019 | Martin | H02S 30/00 |
| 2006/0081496 A1 | 4/2006 | Carter | |
| 2006/0289301 A1 | 12/2006 | Ebert | |
| 2008/0235921 A1 | 10/2008 | Zwier | |
| 2008/0256881 A1 | 10/2008 | Lowry et al. | |
| 2010/0167006 A1 * | 7/2010 | Langemann | B29C 45/14311 |
| | | | 428/122 |
| 2011/0056055 A1 | 3/2011 | Gendraud et al. | |
| 2016/0081236 A1 * | 3/2016 | Kurita | H05K 9/0035 |
| | | | 174/354 |
| 2019/0122645 A1 | 4/2019 | Drake et al. | |

FOREIGN PATENT DOCUMENTS

| | | |
|---|---|---|
| EP | 3064784 A1 | 9/2016 |
| FR | 2623256 B1 | 3/1990 |
| WO | 2008087370 B1 | 12/2008 |
| WO | 2011146967 A1 | 12/2011 |
| WO | 2012031369 A1 | 3/2012 |

OTHER PUBLICATIONS

Search Report, related Chinese Patent Application No. 201880055965.7, dated Mar. 1, 2021, 1 page.

* cited by examiner

EDGE PROTECTOR

RELATED APPLICATIONS

This application represents the United States National Stage of International Application No. PCT/US2018/037184, filed Jun. 13, 2018, which claims priority to U.S. Provisional Patent Application No. 62/530,990, entitled "Edge Protector," filed Jul. 11, 2017, both of which are hereby incorporated by reference in their entirety.

FIELD OF EMBODIMENTS OF THE DISCLOSURE

Embodiments of the present disclosure generally relate to an edge protector that is configured to secure to an edge of a component, such as panel, bracket, fin, sheet, and/or the like.

BACKGROUND

Edge protectors are secured over edges of components, such as panels, brackets, or the like, to protect the edges from damage and/or other components from contacting the edges. A known edge protector is formed of metal and rubber portions, and is configured to fit over an edge of a component. The known edge protector is expensive, and time-consuming to manufacture, due to the use of the metal and rubber portions.

Moreover, the known edge protector simply fits over an edge, without any type of indication that the edge protector is securely connected thereto. Further, the known edge protector is difficult to install, and is susceptible to being misaligned and undesirably bent. As such, an individual may position the known edge protector onto a component and not realize that the edge protector is not secured thereto. Accordingly, the edge protector may undesirably dislodge from a component.

SUMMARY OF EMBODIMENTS OF THE DISCLOSURE

A need exists for a resilient edge protector that may be efficiently manufactured. Further, a need exists for an edge protector that provides an indication of a secure engagement with an edge of a component. Moreover, a need exists for an edge protector that may readily adapt to contours of a component.

With those needs in mind, certain embodiments of the present disclosure provide an edge protector that is configured to secure onto an edge of a component. The edge protector includes a main shrouding body that includes a first wall connected to a second wall by a connecting wall. An open-ended passage is defined between the first wall, the second wall, and the connecting wall. A first securing clamp extends inwardly into the passage from the first wall. A second securing clamp that opposes the first securing clamp extends inwardly into the passage from the second wall. The first securing clamp and the second securing clamp are configured to securely clamp onto a portion of the component.

In at least one embodiment, at least one cutout is formed in the first wall and/or the second wall. For example, a first cutout may be formed in the first wall, and a second cutout may be formed in the second wall. As another example, a first plurality of cutouts may be formed in the first wall, and a second plurality of cutouts may be formed in the second wall. The first plurality of cutouts may be aligned with and mirror the second plurality of cutouts.

In at least one embodiment, the cutout(s) includes a central channel, a cross channel that connects to the central channel (the cross channel may be perpendicular to the central channel), and at least one canted channel extending from at least one end of the cross channel. The central channel may extend over half a width of the first wall or the second wall. The canted channel(s) may be parallel to the central channel.

In at least one embodiment, at least one interior clamp extends from the first wall and/or the second wall into the passage. For example, interior clamps may be positioned on opposite sides of a central channel in front of a cross channel of a cutout. The interior clamp(s) may include a resilient upstanding beam having a clasping front edge.

In at least one embodiment, the main shrouding body is integrally molded and formed as a single piece of injection-molded plastic.

Figure 1:
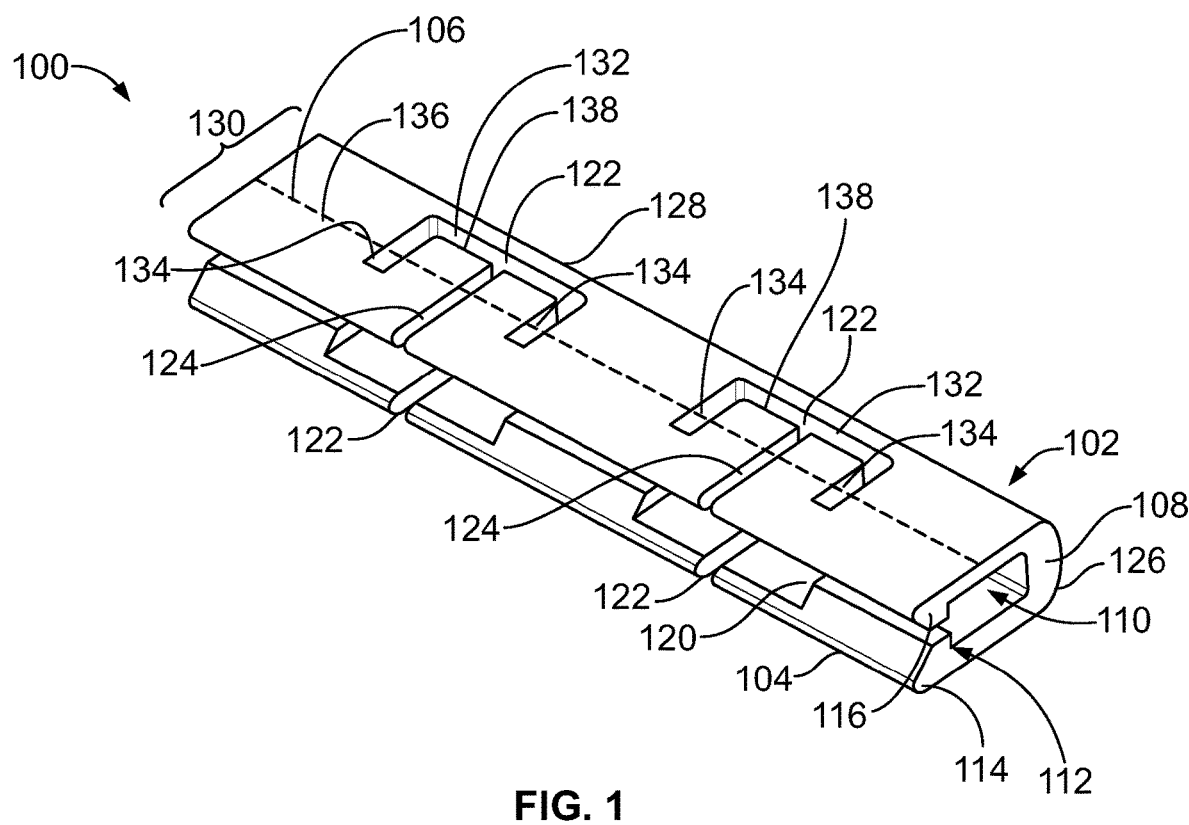
FIG. 1 illustrates a perspective top view of an edge protector, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates a perspective top view of an edge protector 100, according to an embodiment of the present disclosure. The edge protector 100 includes a main shrouding body 102 (such as a sleeve-like body). The main shrouding body 102 includes a first wall 104 (such as a panel) connected to an opposed parallel second wall 106 (such as a panel) by a connecting wall 108, which may be perpendicular to the first wall 104 and the second wall 106. Optionally, the connecting wall 108 may not be perpendicular to the first wall 104 and the second wall 106. An open-ended passage 110 is defined between the first wall 104, the second wall 106, and the connecting wall 108.

A first securing clamp 112 extends inwardly into the passage 110 from an exposed distal end 114 of the first wall 106. A second securing clamp 116 that opposes the first securing clamp 112 extends inwardly into the passage 110 from an exposed distal end 118 of the second wall 106. A gap 120 is defined between the first securing clamp 112 and the second securing clamp 116. The first securing clamp 112 and the second securing clamp 116 are configured to securely clamp onto a portion of a component, such as a panel, bracket, or the like.

Cutouts 122 (such as formed slots) are also formed in each of the first wall 104 and the second wall 106. As shown, the first wall 106 may include two cutouts 122. Similarly, the second wall 106 may include two cutouts 122. In at least one embodiment, the cutouts 122 of the first wall 104 may be aligned with and mirror the cutouts 122 of the second wall 104.

Each cutout 122 includes a central channel 124 that extends through the distal end 114 and 118 towards a proximal end 126 and 128, respectively, that connects to the connecting wall 108. The central channel 124 may extend over half the width 130 of the first wall 104 and the second wall 106. The greater the length of the central channel 124, the greater the flexibility that is provided to the main shrouding body 102. The central channel 124 connects to a perpendicular cross channel 132. The length of the cross channel 132 may be approximately the same length of the central channel 124, but in an orthogonally different orientation. The greater the length of the cross channel 132, the greater the flexibility that is provided to the main shrouding body 102. Optionally, the cross channel 132 may have a length that is greater or less than that of the central channel 124. The different orientations of the central channel 124 and the cross channel 132 provides flexibility to the main shrouding body 102 in different directions.

Canted channels 134 extend from ends of the cross channel 132 towards the distal ends 114 and 118. The canted channels 134 may be perpendicular to the cross channel 132, and may be parallel to each other and the central channel 124. The canted channels 134 do not extend to the distal ends 114 and 118. Instead, the canted channels 134 may terminate proximate to a central longitudinal axis 136 of the first wall 104 and the second wall 106.

The canted channels 134 provide flexibility to the main shrouding body 102 at different areas that are laterally offset from the central channel 124. Alternatively, the cutouts 122 may not include the canted channels 134. In at least one other embodiment, each cutout 122 may include only one canted channel 134 extending from one end of the cross channel 132.

Alternatively, only one of the first wall 104 or the second wall 106 may include the cutouts 122. Further, each of the first wall 104 and/or the second wall 106 may include more or less cutouts 122 than shown. Also, alternatively, the cutouts 122 of the first wall 104 may not be aligned with the cutouts 122 of the second wall 106.

The cutouts 122 provide flexibility and resiliency to the edge protector 100. That is, each of the central channel 124, the cross channel 132, and the canted channels 134 provide flexibility and resiliency to the main shrouding body 102. The central channel 124, the cross channel 132, and the canted channels 134 allow wall portions to deflect and bend to conform to the contours of a component to which the edge protector 100 is attached. As such, the cut-outs allow the edge protector 100 to bend, and adjust to a non-linear edge of a component. Further, a secondary internal edge 138 defined by the cross channel 132 applies additional load with respect to a component to keep the edge protector 100 fully engaged on a surface of the component.

Figure 2:
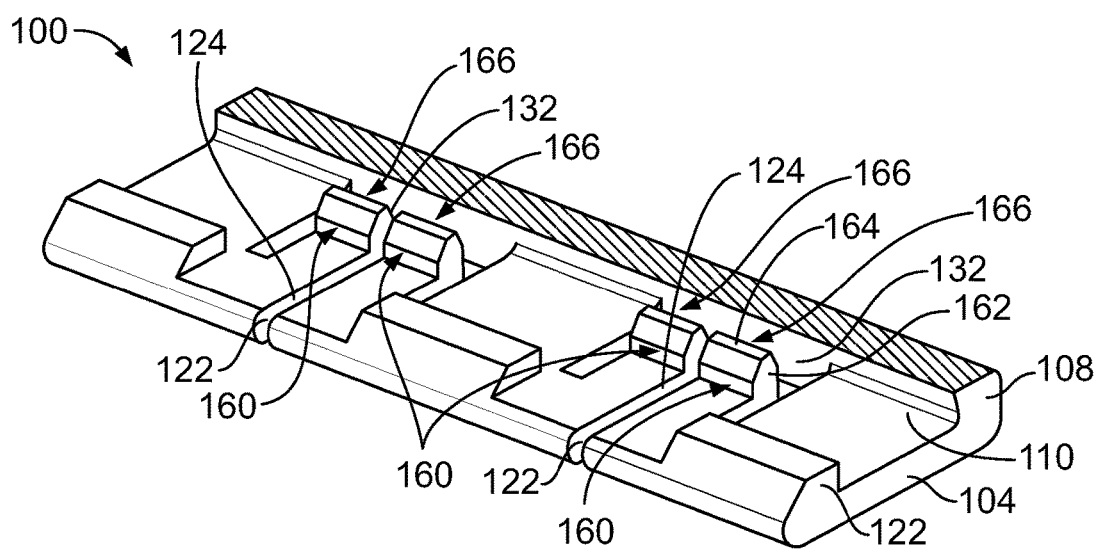
FIG. 2 illustrates a perspective internal view of the edge protector.

FIG. 2 illustrates a perspective internal view of the edge protector 100. For the sake of clarity, only a half of the edge protector 100 is shown. The other half that is not shown may mirror the half of the edge protector 100 that is shown in FIG. 2.

The edge protector 100 may also include interior clamps 160 that extend into the passage 110 proximate to the cross channels 132. An interior clamp 160 may be positioned on either side of a central channel 124 in front of the cross channel 132. That is, interior clamps 160 may be positioned on opposite sides of the central channel 124 in front of the cross channel 132. Each interior clamp 160 may include a resilient upstanding beam 162 having a clasping front edge 164. A rear surface 166 (directed towards the connecting wall 108) may provide a sharp locking edge. The interior clamps 160 are configured to securely engage an edge of a component within the passage 110.

The interior clamps 160 are inboard from the first securing clamp 112 and the second securing clamp 116. That is, the interior clamps 160 are internally offset from the first securing clamp 112 and the second securing clamp 116 towards the connecting wall 108.

Alternatively, only one of the first wall 104 or the second wall 106 may include the interior clamps 160. In at least one other embodiment, the edge protector 100 does not include the interior clamps 160.

Figure 3:
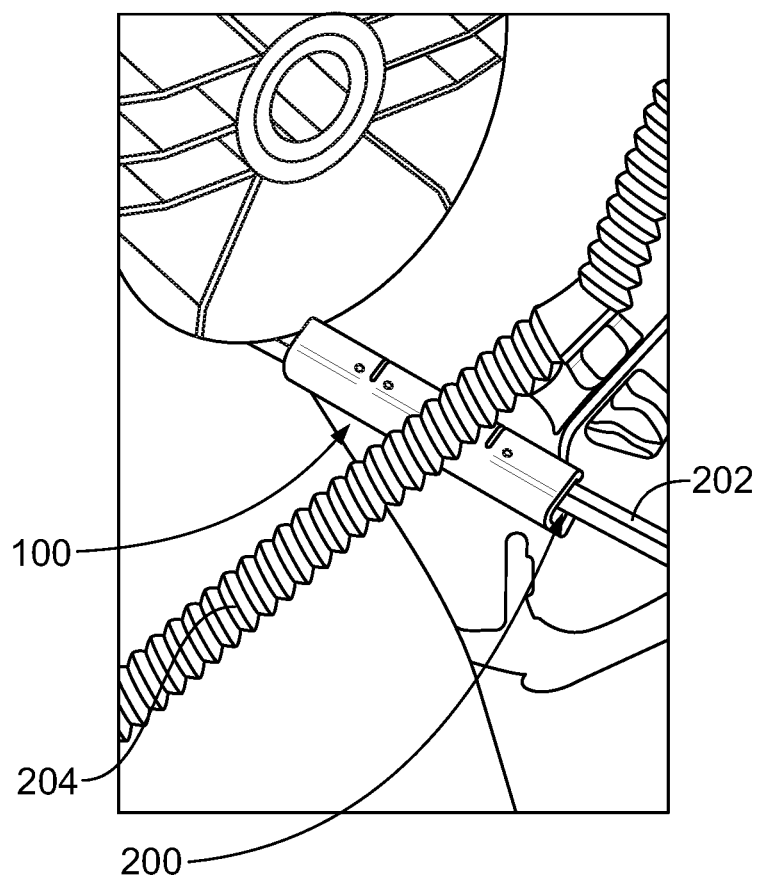
FIG. 3 illustrates a perspective top view of the edge protector secured to an edge of a component, according to an embodiment of the present disclosure.

FIG. 3 illustrates a perspective top view of the edge protector 100 secured to an edge 200 of a component 202, according to an embodiment of the present disclosure. The component 202 may be a panel, bracket, fin, sheet, and/or the like.

Referring to FIGS. 1-3, in operation, the edge protector 100 may be slid onto the edge 200. As the edge protector 100 is positioned on the edge 200, the edge protector 100 covers edge 200. The edge protector 100 prevents surrounding parts, such as a hose 204, wires, and/or the like, from contacting the edge 202, and rubbing/wearing thereon.

The edge protector 100 may be aligned with the edge 200 of the component 202, and pressed on by hand. Upon such urging, the individual feels an initial feedback force via outward deflection of the first securing clamp 112 and the second securing clamp 116. Once the edge protector 100 is pressed on, the load being applied significantly drops, such as by the first securing clamp 112 and the second securing clamp 116 deflecting inwardly towards one another (and/or the interior clamps 160 of the first wall 104 and the second wall 106 deflecting inwardly towards one another), thereby indicating that the edge protector 100 has been properly attached to the edge 200.

The edge protector 100 eliminates, minimizes, blunts, or otherwise reduces sharp edges on components. That is, the edge protector 100 is used to shroud, shield, and/or otherwise protect the sharp edges from being in contact with other parts, components, devices, and/or the like. Similarly, the edge protector 100 protects the other parts, component, devices, and/or the like from contacting sharp edges.

Due to the cutouts 122, the edge protector 100 is able to adjust to various non-linear surfaces and profiles. Edges of components may vary in geometry (in the case of a sharp edge of a stamped part where the edge can be curled and not evenly cut), and the edge protector 100 accommodates such variance with minimum loss in performance.

The edge protector 100 includes two locking features (for example, the first securing clamp 112 and the second securing clamp 116, as well as the interior clamps 160) in different planes (such as horizontal planes, as shown in the orientations of the Figures) to provide an orthogonally-directed clamping force (such as a vertical clamping force). The locations of the first securing clamp 112, the second securing clamp 116, and the interior clamps 160 provide the clamping force at different locations on the component 202.

The interior clamps 160 prevent the edge protector 100 from dislodging off the edge 200, which may be a sharp non-linear surface. As the edge protector 100 is secured onto the component 202, an audible click is emitted, such as by the first securing clamp 112, the second securing clamp 116, and the interior clamps 160 deflecting, thereby indicating a secure connection. The edge protector 100 secured to the component 202 protects against sharp edges that can cut and or chafe wires, hoses, and tubes.

In at least one embodiment, the edge protector 100 is formed from a single shot of material (such as injection-molded plastic), thereby significantly lowering the cost of manufacture (in relation to the known edge protector). For example, the edge protector 100 may be integrally formed and molded as a single piece of injection-molded plastic, and may be devoid of a secondary material, such as rubber. Unlike known edge protectors, the edge protector 100 is configured to flex and bend (due to the cutouts 122), and is able to adapt to a non-linear surface. Further, unlike known edge protectors, the clamping features (for example, the first securing clamp 112, the second securing clamp 116, and the interior clamps 160) of the edge protector 100 provide positive engagement feedback (such as an auditory click or snap) that indicates to an individual that the edge protector 100 is securely mounted to the component 202.

As described herein, embodiments of the present disclosure provide a resilient edge protector that is efficiently manufactured. Further, the edge protector is configured to provide an indication of a secure engagement with an edge of a component. Moreover, the edge protector is configured to readily adapt to contours of a component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. An edge protector that is configured to secure onto an edge of a component, the edge protector comprising:
a main shrouding body that includes a first wall connected to a second wall by a connecting wall, wherein an open-ended passage is defined between the first wall, the second wall, and the connecting wall, each of the first and second wall having a proximal end adjacent to the connecting wall, and a distal end opposite the proximal end;
at least one cutout formed in at least one of the first wall or the second wall, the at least one cutout including a central channel that extends through the distal end and towards the proximal end, and a cross channel that connects to the central channel, wherein the cross channel is perpendicular to the central channel, and wherein the cross channel extends from an end of the central channel that is opposite the distal end;
a first securing clamp extending inwardly into the passage from the first wall; and
a second securing clamp that opposes the first securing clamp and extends inwardly into the passage from the second wall,
wherein the first securing clamp and the second securing clamp are configured to securely clamp onto a portion of the component.

2. The edge protector of claim 1, wherein the at least one cutout comprises a first cutout formed in the first wall, and a second cutout formed in the second wall.

3. The edge protector or claim 1, wherein the at least one cutout comprises a first plurality of cutouts formed in the first wall, and a second plurality of cutouts formed in the second wall.

4. The edge protector of claim 3, wherein the first plurality of cutouts are aligned with and mirror the second plurality of cutouts.

5. The edge protector of claim 1, wherein the at least one cutout further comprises
at least one canted channel extending from at least one end of the cross channel.

6. The edge protector of claim 5, wherein the central channel extends over half a width of the first wall or the second wall.

7. The edge protector of claim 5, wherein the at least one canted channel is parallel to the central channel.

8. The edge protector of claim 1, further comprising at least one interior clamp extending from at least one of the first wall or the second wall into the passage.

9. The edge protector of claim 8, wherein the at least one interior clamp comprises interior clamps on opposite sides of the central channel in front of the cross channel of the cutout.

10. The edge protector of claim 8, wherein the at least one interior clamp comprises a resilient upstanding beam having a clasping front edge.

11. The edge protector of claim 1, wherein the main shrouding body is integrally molded and formed as a single piece of injection-molded plastic.

12. The edge protector of claim 1, wherein the cross channel is approximately the same length as the central channel.

13. An edge protector that is configured to secure onto an edge of a component, the edge protector comprising:
a main shrouding body that includes a first wall connected to a second wall by a connecting wall, wherein an open-ended passage is defined between the first wall, the second wall, and the connecting wall;

a first securing clamp extending inwardly into the passage from the first wall;

a second securing clamp that opposes the first securing clamp and extends inwardly into the passage from the second wall, wherein the first securing clamp and the second securing clamp are configured to securely clamp onto a portion of the component;

at least one interior clamp extending from at least one of the first wall or the second wall into the passage; and at least one cutout formed in at least one of the first wall or the second wall, the at least one cutout comprising:
  a central channel;
  a cross channel that connects to the central channel, wherein the cross channel is perpendicular to the central channel; and
  at least one canted channel extending from at least one end of the cross channel.

14. The edge protector of claim 13, wherein the at least one cutout comprises a first cutout formed in the first wall, and a second cutout formed in the second wall.

15. The edge protector or claim 13, wherein the at least one cutout comprises a first plurality of cutouts formed in the first wall, and a second plurality of cutouts formed in the second wall.

16. The edge protector of claim 15, wherein the first plurality of cutouts are aligned with and mirror the second plurality of cutouts.

17. The edge protector of claim 13, wherein the central channel extends over half a width of the first wall or the second wall, and wherein the at least one canted channel is parallel to the central channel.

18. The edge protector of claim 13, wherein the at least one interior clamp comprises interior clamps on opposite sides of a central channel in front of a cross channel of a cutout.

19. The edge protector of claim 13, wherein the at least one interior clamp comprises a resilient upstanding beam having a clasping front edge.

20. The edge protector of claim 13, wherein the main shrouding body is integrally molded and formed as a single piece of injection-molded plastic.

\* \* \* \* \*